INVENTORS
HOMER J. SHAFER &
GEORGE T. JOHNSON
BY
Ely, Frye & Hamilton
ATTORNEYS

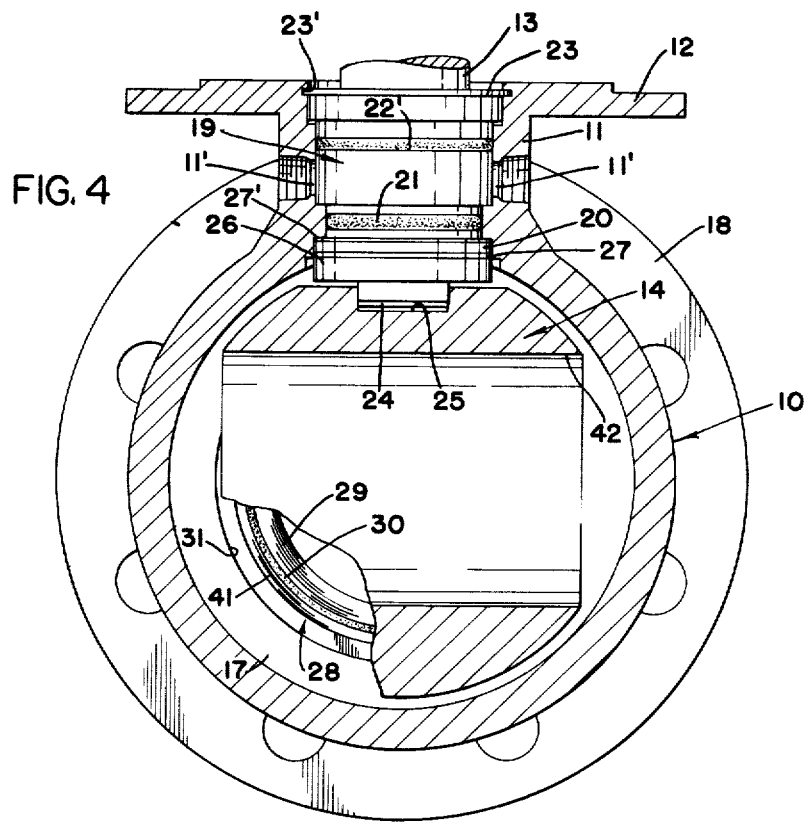
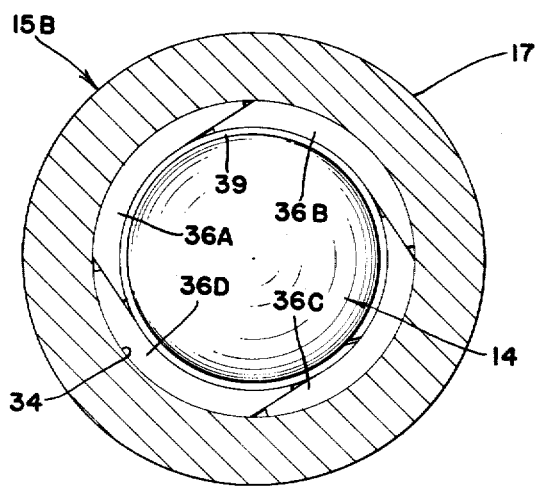

United States Patent Office 3,083,945
Patented Apr. 2, 1963

3,083,945
REMOVABLE SEALING CONSTRUCTION
FOR VALVES
Homer J. Shafer and George T. Johnson, Mansfield, Ohio, assignors to Shafer Valve Company, Mansfield, Ohio, a corporation of Ohio
Filed Apr. 27, 1960, Ser. No. 25,114
13 Claims. (Cl. 251—363)

The invention relates generally to novel and improved removable and replaceable sealing means for valves, and more particularly for valves in which the valve body is of welded construction so that it can not be taken apart.

Patent No. 2,890,017, issued June 9, 1959, discloses several forms of valve bodies constructed of pre-formed tubes welded together and having a ball shut-off with a through port rotatable into alignment with the flow ports of the body. In one of those forms the sealing means for the ball is removable by removing thimble tubes telescoped in the ends of the valve body, but such construction requires a through port in the ball of reduced diameter which, with the thimble tubes, provides a venturi flow passage through the valve. In all forms in said patent having a full flow opening through the valve, the sealing means must be inserted before welding the valve body parts together and can not be removed without cutting the valve body apart and substantially destroying it.

When the valve body is welded together with the sealing means in place, the welding operation usually precludes using a resilient O-ring type of seal because the heat of welding would damage or destroy the resiliency of the O-rings.

It is an object of the present invention to provide a novel and improved valve sealing construction which can be inserted or removed through the flow ports of the valve body.

Another object is to provide an improved removable sealing construction which gives a full port opening through the valve.

A further object is to provide an improved O-ring sealing construction for a ball valve having a welded body, in which the O-rings can be inserted after the body is welded together.

A still further object is to provide a simple and inexpensive removable sealing construction for a ball valve having a welded body, which enables accurately fitting the ball in proper operating position in abutment with the sealing means before welding the body.

Another object is to provide an improved removable sealing construction for a valve which seals equally well for flow through the valve in either direction.

Still another object is to provide an improved removable vented O-ring sealing construction which prevents displacement of the ring from its groove under all conditions of opening and closing the valve.

These and other objects are accomplished by the elements, combinations and arrangements comprising the present improved construction, a preferred embodiment of which is shown by way of example in the accompanying drawings and described in detail herein. Various modifications and changes in details of construction may be made without departing from the scope of the invention as defined in the appended claims.

Referring to the drawings:

FIG. 4 is a cross sectional view as on line 4—4 of FIG. 1.

FIG. 5 is a cross sectional view as on line 5—5 of FIG. 1.

Figures 1, 2, 3:
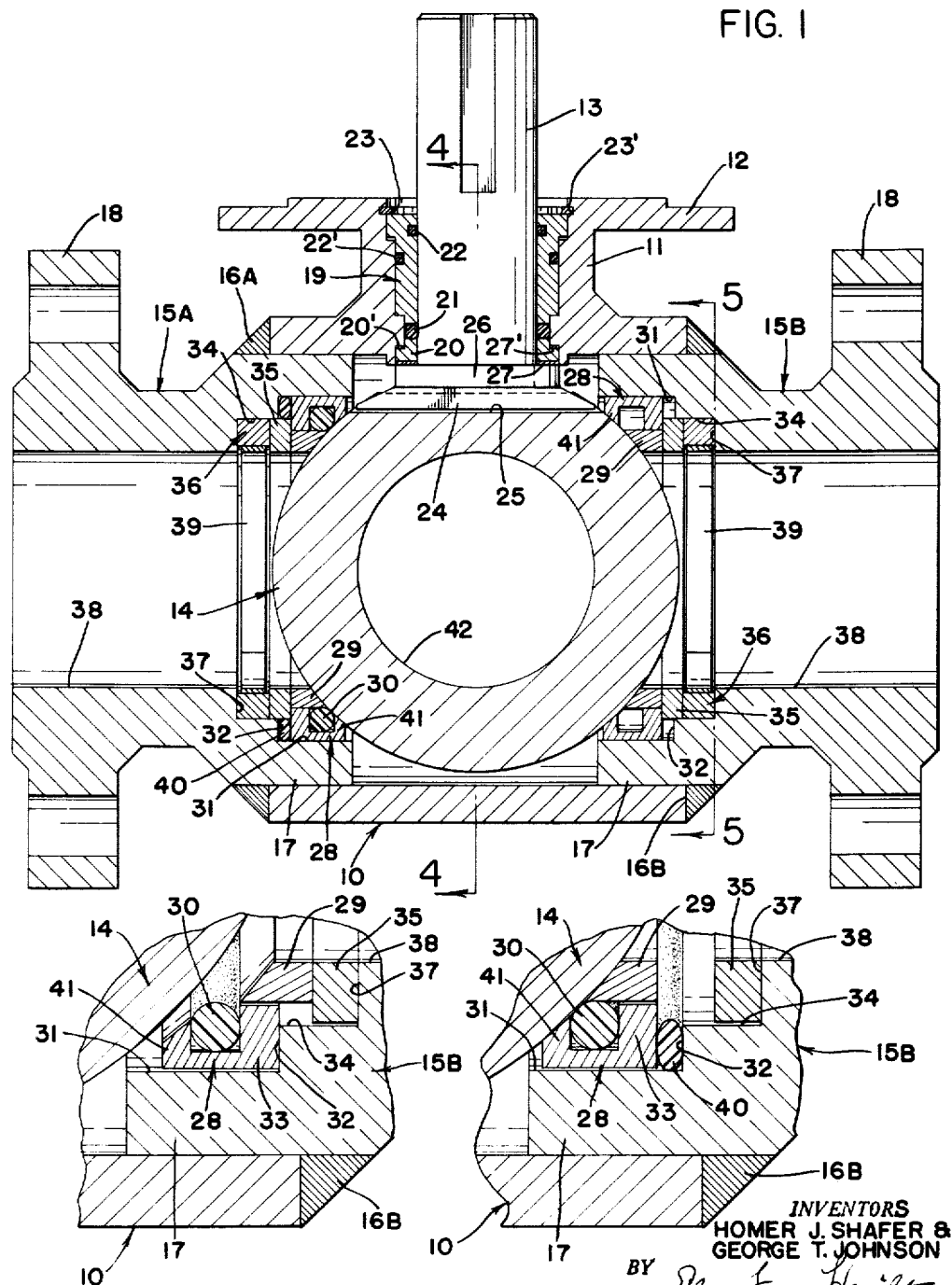
FIG. 1 is a vertical sectional view along the flow axis of a ball valve having a welded body and embodying the improved sealing construction, with the ball shut-off in closed position and the resilient O-rings removed on one side of the ball.
FIGS. 2 and 3 are enlarged fragmentary sectional views showing the manner of inserting or removing the resilient O-rings.

The body of the valve comprises a central tube indicated generally at 10 having its axis coinciding with the flow axis of the valve. A valve stem tube 11 extends radially from said tube 10 and has a mounting flange 12 at its outer end disposed at right angles to the axis of tube 11. The flange 12 is adapted to support a hydraulic motor which rotates the stem 13 of the ball shut-off 14 within the tube 10.

Flow tubes 15A and 15B, having their axes coincident with the axis of tube 10, are telescoped in the ends of tube 10 and welded thereto at 16A and 16B, respectively, to make an integral body. The tubes 15A and 15B have cylindrical flanges 17 at their inner ends fitting within the tube 10, and preferably annular bolting flanges 18 at their outer ends for connection to similar bolting flanges on the pipe line in which the valve is connected.

Preferably, the valve stem 13 is journaled within the tube 11 in a gland bushing 19 and flanged bushing 20, both of which may be of suitable material. An O-ring seal 21 may be provided between the bushing 19 and bushing 20, and smaller O-rings 22 and 22' are preferably provided between the bushing 19 and stem 13, and between the bushing 19 and the tube 11. The bushing 19 is removably mounted in the valve stem tube 11 by a snap ring 23 which is received in an annular groove 23' in the outer end of tube 11. Lubricant may be supplied between the bushing 19 and tube 11 through ports 11' which are normally plugged shut.

The inner end of the stem 13 has a key 24 which extends into the keyway 25 of the ball 14, and an annular flange 26 adjoining the key 24 seats against a bearing washer 27 between the flange 26 and the bushing 20. The upward thrust of the ball on bearing washer 27 is taken by a bearing washer 27' interposed between the bushing 20 and the annular shoulder 20' on the body, so that the only thrust on bushing 19 is the small amount transmitted by O-ring 21, which amount is easily resisted by snap ring 23. The keyway 25 is at right angles to the flow axis of the ball 14, so that when the ball is in closed position, as in FIG. 1, the line pressure on one side of the ball will force it against the seat on the opposite side.

The improved sealing means is shown fully assembled with the O-rings in place on the left side of the ball in FIG. 1. The sealing means on the right side of the ball is assembled with the O-rings removed which would be the condition before welding the tubes 15A and 15B to the central tube 10. The novel sealing means includes a sealing metal retainer ring 28 and a metal seating ring 29 for substantially enclosing a resilient O-ring 30, one portion of which bears against the ball 14. As used herein, the term O-ring is intended to cover resilient sealing rings having a variety of cross sectional shapes other than circular. The rings 28 and 29 are positioned in annular grooves 31 in the inner ends of cylindrical flanges 17 of tubes 15A and 15B, and said grooves are open at their inner ends adjacent the ball 14. Shoulders 32 are formed at the outer ends of grooves 31 by shallower annular grooves 34, which may be considered continuations of grooves 31 having reduced diameters.

Within each groove 34 is a metal back-up ring 35 normally abutting rings 28 and 29 and behind the ring 35 is a radially contractible metal retainer ring 36 which normally occupies the space between ring 35 and the shoulder 37 (FIG. 3) at the outer end of groove 34. The rings 36 are preferably segmental, preferably having four segments 36A, 36B, 36C and 36D, as shown in FIG. 5, which enables radially contracting and inserting of removing the rings 36 by reaching through the outer ends of the flow ports 38 of the tubes 15A and 15B. A snap or spring ring 39 normally holds the segments in position in the groove 34 in proper abutting relation to make a continuous ring.

In the fully assembled position of the metal rings 28, 29, 35 and 36, there is an annular space between each shoulder 32 and the adjacent face of leg 33 of ring 28, and this space is normally occupied by a resilient O-ring 40 having an elliptical cross section so that it is compressed by abutment on all four sides of the rectangle formed by rings 28 and 35, shoulder 32 and groove 31.

The rings 28 are substantially U-shaped in cross section, and the inner leg 41 of each ring 28 has a spherical surface extending annularly of the ring for seating against the spherical surface of the ball 14. Similarly, the inner face of ring 29 is spherical and extends annularly of the ring for seating against the ball.

In the normal position of rings 28 and 29, as shown on the left side of FIG. 1 and in FIG. 3, the ring 29 forms with the ring 28 a substantially square groove compressing the O-ring 30 on all four sides, with the O-ring seating against the ball only at one corner, so that the O-ring is securely retained in its groove as the ball is rotated under high line pressures. As indicated in FIGS. 3 and 4, the rings 28 and 35 have a slightly loose fit in grooves 31 and 34, respectively, and the ring 29 fits somewhat loosely within the outer leg 33 of ring 28, so that the rings can be easily slid axially of the tubes 15A and 15B.

In assembling the valve prior to welding the body, the valve stem 13, with bushing 20 and washer 27 thereon, is inserted into the central tube 10 and the stem inserted upwardly through the tube 11. O-ring 21, and bushing 19, with its O-rings 22 and 22′, are then inserted downwardly around the stem and the snap ring 23 placed in position to hold bushing 19 in place. The ball 14 is then inserted into tube 10 in the closed position shown, and the key 24 slid into keyway 25.

Next, the ball is turned to open position and the tubes 15A and 15B, with the metal rings 28, 29, 35 and 36 in place in the grooves 31 and 34 and the snap rings 39 holding rings 36, are inserted in the ends of central tube 10. Then the rings 28 and 29 are pressed into abutment with the ball, and the flow ports 38 are accurately aligned with the flow port 42 of the ball. With the flow ports aligned, the tubes 15A and 15B are clamped by any suitable adjustable clamping mechanism which is adjusted to vary the abutting pressure of the tubes and their rings 28 and 29 on the ball while turning stem 13 manually, to make sure that the ball turns freely while fitting snugly between the rings seating against it.

While thus clamping the tubes and their metal rings in position, the tubes 15A and 15B are tack welded to tube 10 at 16A and 16B, the clamping mechanism removed, and the turning of the ball again checked. If the ball is too tight or too loose, the snap rings 39 and the segmental rings 36 may be removed and replaced with rings of slightly different axial thickness, or the rings may be machined or shimmed as required.

After the turning movement of the ball is satisfactorily adjusted, the rings 36 and 39 are removed, and rings 28, 29 and 35 are retracted to the position of FIG. 2, with the rings 35 abutting the shoulders 37. In this position of the metal rings, the O-rings 30 can be inserted into the grooves in rings 28, as shown.

Rings 28 and 29 are then advanced inwardly against the ball as shown in FIG. 3, and this opens the annular spaces between shoulders 32 and legs 33 of rings 28, into which the O-rings 40 can now be inserted. Next rings 35 are advanced into abutment with rings 28 and 29, and the rings 36 and 39 inserted in the annular spaces between rings 35 and shoulders 37 to complete the assembly.

When the ball is subjected to line pressure forcing the ball against the sealing means on the downstream side of the ball, the ring 29 on said downstream side is located at the most advantageous bearing location, because it is at the shortest radius from the flow line axis and thus results in the least possible wedging action on the ball, which would cause binding against turning.

The O-ring 30 on the downstream side is always vented to the downstream pressure to aid holding the O-ring in its groove as the flow port 42 of the ball crosses the sealing means during opening and closing movement. This venting is provided from the O-ring groove between ring 29 and leg 33 and then between rings 29 and 35 into the flow port 38.

The O-ring 32 seals in a radially outward or inward direction, depending upon the direction of pressure differential to which it is subjected. Thus, on the downstream side, if the pressure in the valve cavity outside of the ball between annular flanges 17 is greater than that in the downstream flow passage 38, the O-ring 32 will seal radially inward against ring 35. On the upstream side, the ring 32 will be subjected to upstream presssure flowing around ring 35 in a radially outward direction, and the O-ring 32 will seal radially outward against the outer surface of annular groove 31.

The improved sealing construction permits using resilient O-ring seals in a ball valve having a welded body and a full port opening, without subjecting the O-rings to the heat of welding, and the sealing means can be adjusted to position the ball in proper alignment and with proper turning movement before the O-rings are inserted. Moreover, the improved sealing means seals equally well for flow through the valve is either direction.

While the improved sealing construction has been described as applied to a ball valve, it is obvious that it can be applied to other types of valves.

What is claimed is:

1. Sealing construction for a valve having a body and a valve element movable therein to open and closed positions, said body having an annular groove opening toward one side of said valve element, a retaining ring movable axially in said groove into conforming abutment with said valve element, a seating ring abutting the radially inner surface of said retaining ring and movable axially into conforming abutment with said valve element, said rings forming an annular enclosure substantially rectangular in cross section with one corner open at the surface of said valve element, a resilient sealing ring in said enclosure abutting said valve element at said corner, and a radially contractible removable ring in said groove for holding said retaining and seating rings against said valve element.

2. Sealing construction for a valve having a body and a valve element movable therein to open and closed positions, said body having an annular groove opening toward one side of said valve element, a retaining ring movable axially in said groove into conforming abutment with said valve element, a seating ring abutting the radially inner surface of said retaining ring and movable axially into conforming abutment with said valve element, said rings forming an annular enclosure substantially rectangular in cross section with one corner opening at the surface of said valve element, a resilient sealing ring in said enclosure abutting said valve element at said corner, a radially contractible removable ring in said groove for holding said retaining and seating rings against said valve element, and a back-up ring in said groove between said removable ring and said retaining and seating rings.

3. Sealing construction for a valve having a body and a valve element movable therein to open and closed positions, said body having an annular groove opening toward one side of said valve element, a channeled retaining ring movable axially in said groove into conforming abutment with said valve element, a resilient sealing ring in said retaining ring, a seating ring abutting the radially inner surface of said retaining ring and movable axially into conforming abutment with said valve element, said retaining and seating rings forming a substantially closed annular enclosure for said resilient ring with a narrow annular portion thereof abutting said valve element, and a radially contractible removable ring in said annular groove in said body for holding said retaining and sealing rings against said valve element.

4. Sealing construction for a valve having a body and a valve element movable therein to open and closed positions, said body having an annular groove opening toward one side of said valve element, a channeled retaining ring movable axially in said groove into conforming abutment with said valve element, a resilient sealing ring in said retaining ring, a seating ring abutting the radially inner surface of said retaining ring and movable axially into conforming abutment with said valve element, said retaining and seating rings forming a substantially closed annular enclosure for said resilient ring with a narrow annular portion thereof abutting said valve element, a radially contractible removable ring in said annular groove in said body for holding said retaining and seating rings against said valve element, and a back-up ring in said body groove between said removable ring and said retaining and seating rings.

5. Sealing construction for a valve having a body and a valve element movable therein to open and closed positions, said body having a first annular groove opening at one end toward one side of said valve element, a second shallower annular continuing groove in said body forming a shoulder at the other end of said first groove, a channeled retaining ring movable axially in said first groove into conforming abutment with said valve element and extending radially inward of said second groove, a resilient sealing ring in said retaining ring, a seating ring abutting the radially inner surface of said retaining ring and movable axially into conforming abutment with said valve element, said retaining and seating rings forming a substantially enclosed annular channel for said resilient ring with a narrow annular portion thereof abutting said valve element, and a radially contractible removable ring in said second body groove for holding said retaining and seating rings against said valve element.

6. Sealing construction for a valve having a body and a valve element movable therein to open and closed positions, said body having a first annular groove opening at one end toward one side of said valve element, a second shallower annular continuing groove in said body forming a shoulder at the other end of said first groove, a channeled retaining ring movable axially in said first groove into conforming abutment with said valve element and extending radially inward of said second groove, a resilient sealing ring in said retaining ring, a seating ring abutting the radially inner surface of said retaining ring and movable axially into conforming abutment with said valve element, said retaining and seating rings forming a substantially enclosed annular channel for said resilient ring with a narrow annular portion thereof abutting said valve element, a radially contractible removable ring in said second body groove for holding said retaining and seating rings against said valve element, and a back-up ring in said second groove between said removable ring and said retaining and seating rings.

7. Sealing construction for a valve having a body and a valve element movable therein to open and closed positions, said body having a first annular groove opening at one end toward one side of said valve element, a second shallower annular continuing groove in said body forming a shoulder at the other end of said first groove, a channeled retaining ring movable axially in said first groove into conforming abutment with said valve element and extending radially inward of said second groove, a resilient sealing ring in said retaining ring, a seating ring abutting the radially inner surface of said retaining ring and movable axially into conforming abutment with said valve element, said retaining and seating rings forming a substantially enclosed annular channel for said resilient ring with a narrow annular portion thereof abutting said valve element, a second resilient sealing ring in said first body groove between said retaining ring and said shoulder, and a radially contractible removable ring in said second groove for holding said retaining and seating rings against said valve element.

8. Sealing construction for a valve having a body and a valve element movable therein to open and closed positions, said body having a first annular groove opening at one end toward one side of said valve element, a second shallower annular continuing groove in said body forming a shoulder at the other end of said first groove, a channeled retaining ring movable axially in said first groove into conforming abutment with said valve element and extending radially inward of said second groove, a resilient sealing rnig in said retaining ring, a seating ring abutting the radially inner surface of said retaining ring and movable axially into conforming abutment with said valve element, said retaining and seating rings forming a substantially enclosed annular channel for said resilient ring with a narrow annular portion thereof abutting said valve element, a second resilient sealing ring in said first body groove between said retaining ring and said shoulder, a radially contractible removable ring in said second groove for holding said retaining and seating rings against said valve element, and a back-up ring in said second groove normally overlying said second resilient ring and located between said removable ring and said retaining and seating rings.

9. Sealing construction for a valve having a body and a valve element movable therein to open and closed positions, said body having an annular groove opening toward one side of said valve element, a shallower second continuing groove in said body forming a shoulder at the other end of said first groove, means retaining a resilient sealing ring in said first groove in abutment with said valve, a seating ring normally overlying said resilient sealing ring and abutting said valve element, said seating ring being movable axially within said second groove to uncover said resilient sealing ring, and a radially contractible removable ring in said second groove for normally holding said seating ring against said valve element.

10. Sealing construction for a valve having a body and a valve element movable therein to open and closed positions, said body having an annular groove opening toward one side of said valve element, a shallower second continuing groove in said body forming a shoulder at the other end of said first groove, means retaining a resilient sealing ring in said first groove in abutment with said valve element, a seating ring normally overlying said resilient sealing ring and abutting said valve element, said seating ring being movable axially within said second groove to uncover said resilient sealing ring, a radially contractible segmental removable ring in said second groove for holding said seating ring against said valve element, and a spring ring normally holding said segmental ring in radially expanded position.

11. Sealing construction for a valve having a body and a valve element movable therein to open and closed positions, said body having a first annular groove opening toward one side of said valve element, a shallower annular continuing groove in said body forming a shoulder at the other end of said first groove, a retaining ring movable axially in said first groove and extending radially inward of said second groove, said retaining ring being U-shaped in cross section having one leg adapted to conform to the surface of said valve element and the other leg adapted to abut said shoulder, said retaining ring adapted for receiving a resilient sealing ring between said legs, a seating ring slidably abutting the radially inner surface of said retaining ring and movable axially into conforming abutment with said valve element, a radially contractible segmental removable ring in said second body groove, and a back-up ring in said second groove between said removable ring and said retaining and seating rings to hold said retaining and seating rings against said valve element.

12. Sealing construction for a valve having a body and a valve element movable therein to open and closed positions, said body having a first annular groove opening toward one side of said valve element, a shallower annular continuing groove in said body forming a shoulder at the other end of said first groove, a retaining ring movable axially in said first groove and extending radially inward of said second groove, said retaining ring being U-shaped in cross section having one leg adapted to conform to the surface of said valve element and the other leg adapted to abut said shoulder, said retaining ring adapted for receiving a resilient sealing ring between said legs, a seating ring slidably abutting the radially inner surface of said retaining ring and movable axially into conforming abutment with said valve element, a radially contractible segmental removable ring in said second body groove, a spring ring normally holding said segmental ring in radially expanded position, and a back-up ring in said second body groove between said removable ring and said retaining and seating rings normally to hold said retaining and seating rings against said valve element, said retaining ring being normally spaced from said shoulder to form an annular groove for receiving a resilient sealing ring normally underlying said back-up ring.

13. Sealing construction for a valve having a body and a valve element movable therein to open and closed positions, said body having a flow port provided with a first groove opening at one end toward a side of said valve element, a reduced diameter second groove in said body forming a shoulder at the other end of said first groove, annular sealing means within said first groove and normally in abutment with said valve member, said sealing means being movable axially within said first groove, a resilient sealing ring within said first groove between said sealing means and said shoulder and removable through said flow port, a radially contractible ring within said second groove and removable through said flow port for holding said sealing means in abutment with said valve element, and a back-up ring within said second groove between said contractible ring and said sealing means for overlying said sealing ring, said sealing ring being confined on four sides by said sealing means, said first groove, said shoulder and said back-up ring.

References Cited in the file of this patent

UNITED STATES PATENTS

| | | |
|---|---|---|
| 2,605,994 | Borschadt | Aug. 5, 1952 |
| 2,661,926 | Resek | Dec. 8, 1953 |
| 2,876,987 | Renfro | Mar. 10, 1959 |
| 2,886,282 | Miller | May 12, 1959 |
| 2,912,217 | Freeman | Nov. 10, 1959 |
| 2,916,254 | Wendell | Dec. 8, 1959 |
| 2,963,262 | Shafer | Dec. 6, 1960 |

UNITED STATES PATENT OFFICE
CERTIFICATE OF CORRECTION

Patent No. 3,083,945                      April 2, 1963

Homer J. Shafer et al.

It is hereby certified that error appears in the above numbered patent requiring correction and that the said Letters Patent should read as corrected below.

Column 4, line 59, for "opening" read -- open --; column 6, line 13, for "rnig" read -- ring --; line 34, after "valve" insert -- element --; column 8, line 20, for "Borschadt" read -- Borchardt --.

Signed and sealed this 21st day of January 1964.

(SEAL)
Attest:
ERNEST W. SWIDER                        EDWIN L. REYNOLDS

Attesting Officer                   Acting Commissioner of Patents